Oct. 11, 1938.  W. H. BASELT  2,133,243
BRAKE ARRANGEMENT
Filed March 11, 1935  4 Sheets-Sheet 1
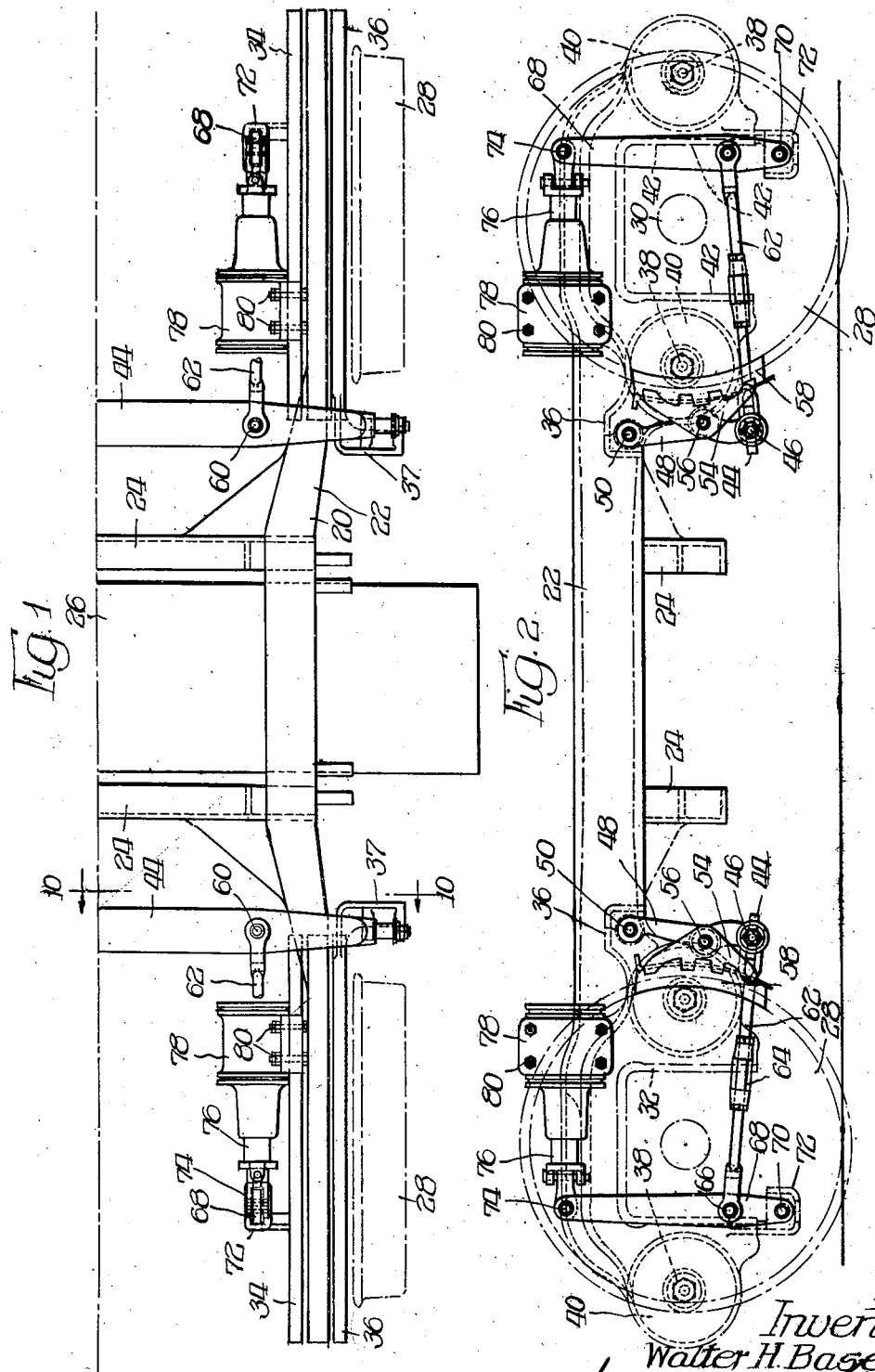

Oct. 11, 1938.  W. H. BASELT  2,133,243
BRAKE ARRANGEMENT
Filed March 11, 1935  4 Sheets—Sheet 2
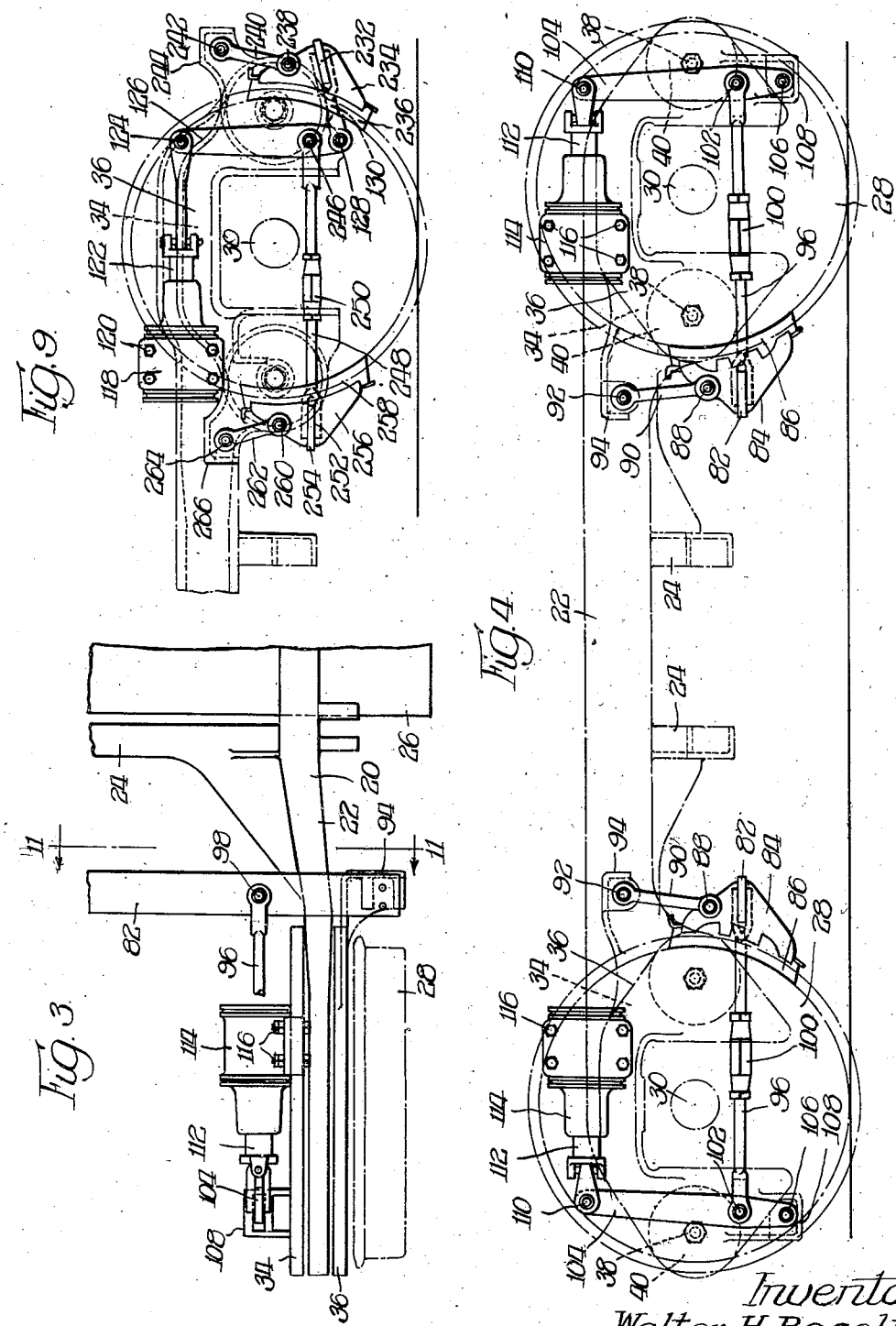
Inventor,
Walter H. Baselt,
By Wilkinson, Huxley, Byron & Knight
Attys Oct. 11, 1938.  W. H. BASELT  2,133,243
BRAKE ARRANGEMENT
Filed March 11, 1935  4 Sheets-Sheet 3
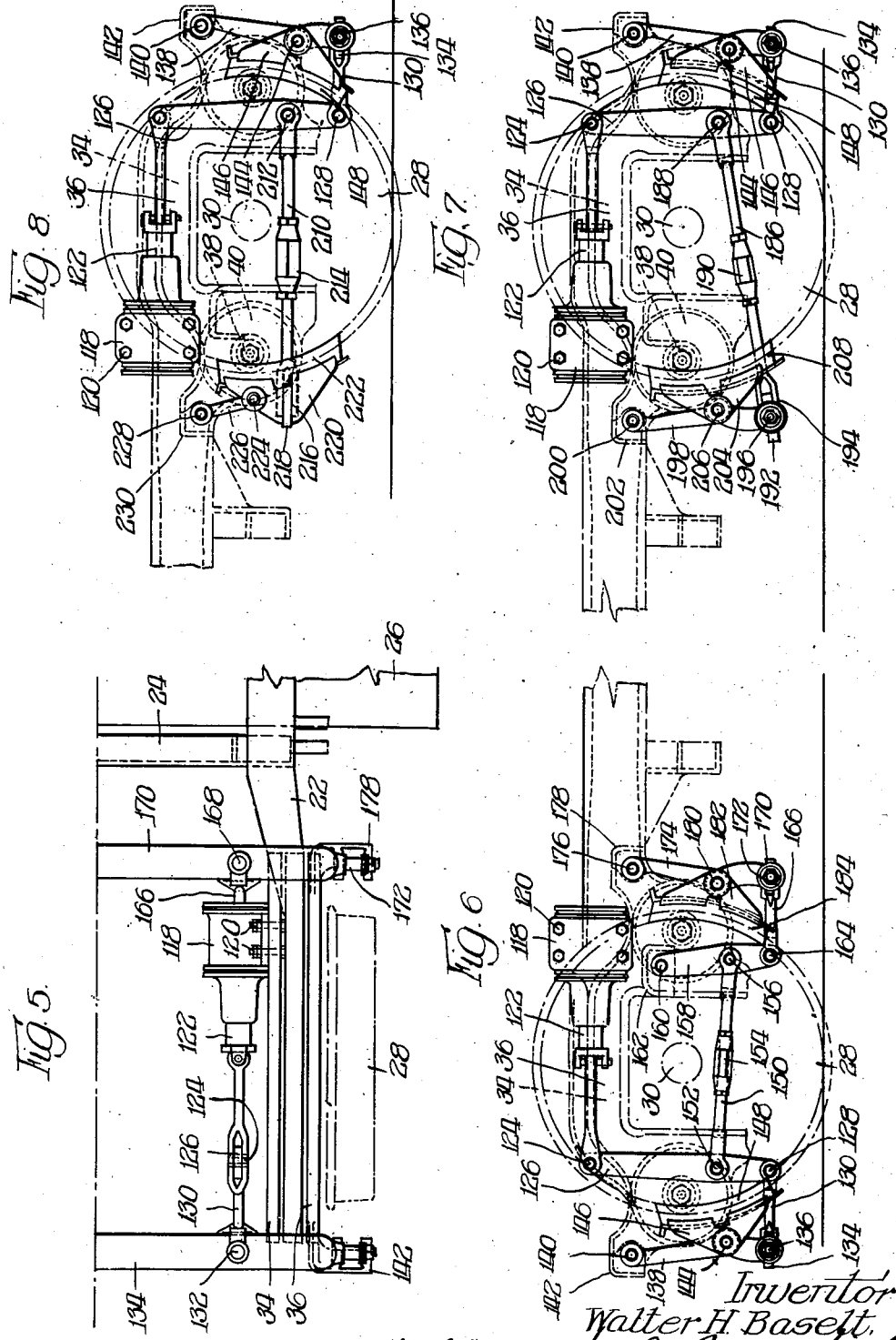
Inventor:
Walter H. Baselt,
By Wilkinson, Huxley, Byron & Knight
attys.

Oct. 11, 1938.  W. H. BASELT  2,133,243
BRAKE ARRANGEMENT
Filed March 11, 1935 4 Sheets-Sheet 4
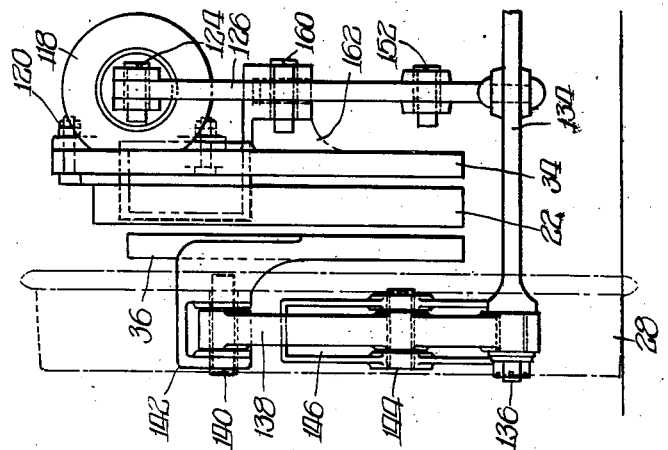
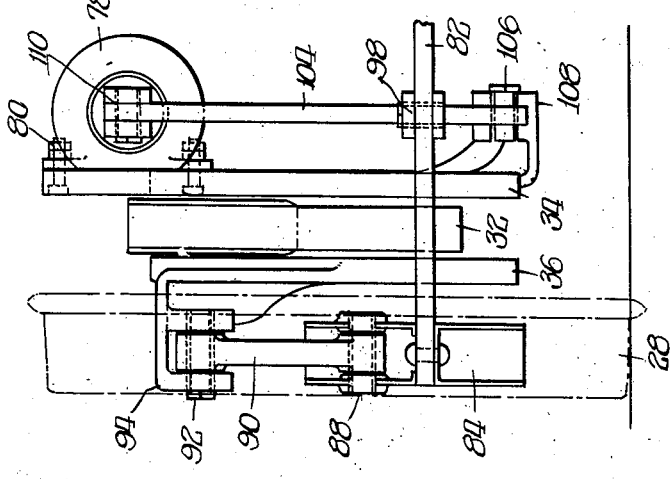
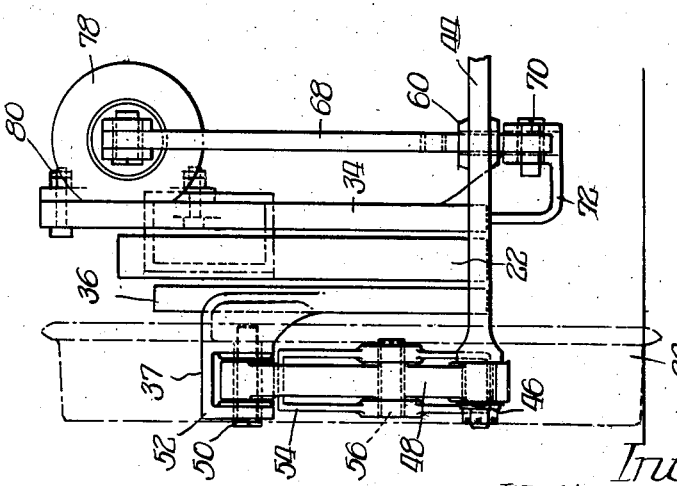
Inventor:
Walter H. Baselt,
By Wilkinson, Huxley, Byron & Knight
Attys.

Patented Oct. 11, 1938

2,133,243

UNITED STATES PATENT OFFICE 2,133,243

BRAKE ARRANGEMENT

Walter H. Baselt, Chicago, Ill., assignor to American Steel Foundries, Chicago, Ill., a corporation of New Jersey Application March 11, 1935, Serial No. 10,349

55 Claims. (Cl. 188—56)

This invention relates to railway car trucks, and more particularly to brake mechanism particularly adapted for the new type of light high speed cars.

An object of the invention is to provide a truck and brake arrangement in which there is proper flexibility between various portions of the truck to permit of easy and uncramped operation thereof and of the brakes, and at the same time maintain sufficient rigidity to meet safe operating requirements.

Another object is to provide brake mechanism for such trucks which will have the necessary clearance for effective operation within a relatively small space.

Still another object is to provide a truck and brake combination particularly for the light high speed railway cars adapted to meet the various requirements for successful operation and service.

Yet another object of the invention is to provide single shoe and clasp brake arrangements for trailer trucks of high speed trains, said trucks being those not equipped with traction motors.

With these and various other objects in view, the invention may consist of certain novel features of construction and operation, as will be more fully described and particularly pointed out in the specification, drawings and claims appended hereto.

In the drawings, which illustrate embodiments of the device and wherein like reference characters are used to designate like parts—

Figure 1 is a fragmentary top plan view of a railway car truck embodying the invention, it being understood that the other half of said car truck is symmetrical with the half shown.

Figure 2 is a fragmentary side elevation of the truck and brake construction shown in Figure 1.

Figure 3 is a fragmentary top plan view of a railway car truck showing a modified form of brake arrangement from that illustrated in Figure 1.

Figure 4 is a side elevation of a railway car truck having applied thereto the brake arrangement illustrated in Figure 3.

Figures 5 and 6 are respectively fragmentary top plan and side elevational views of an arrangement showing a further modification of the invention.

Figures 7, 8 and 9 are fragmentary side elevations showing further modified forms of the invention.

Figure 10 is a fragmentary sectional view taken substantially in the plane as indicated by the line 10—10 of Figure 1.

Figure 11 is a fragmentary sectional view taken substantially in the plane as indicated by the line 11—11 of Figure 3.

Figure 12 is a fragmentary sectional end elevation of the truck construction illustrated in Figure 5.

Referring first of all more particularly to the truck construction illustrated, the truck consists essentially of the truck frame 20 having spaced side frames 22 integrally connected by means of the spaced transoms 24 forming a bolster opening for the reception of the usual load carrying member or bolster 26. The truck illustrated is of the inboard type, the truck being supported by means of the spaced wheel and axle assemblies 28, the axles being generally indicated in side elevation as at 30.

The side frames are provided with the pedestal jaws 32 normally spaced from the journal means (not shown) having bearing cooperation with the wheel and axle assemblies. The side frames are provided with inner and outer wing castings 34 and 36 secured to the side frames adjacent the pedestals by means of the bolts 38, resilient means, such as rubber doughnuts or pads 40, being provided between the wing castings and the side frames to permit limited relative movement between said wing castings and side frames. The wing castings are provided with the pedestal jaws 42 adapted to engage the journal means whereby relative movements are permitted between the wheel and axle assemblies and the truck frame through the wing castings and resilient pads.

Referring now more particularly to the brake arrangement and supporting structure therefor, such as illustrated in Figures 1, 2 and 10, the brake beam 44 is disposed adjacent the inner periphery of the wheel and axle assembly 28 and is pivotally connected as at 46 to the lower end of the hanger lever 48, the upper end of the said hanger lever 48 being pivotally connected as at 50 to the bracket 37 provided on the outer wing casting 36. The brake head 54 is pivotally connected as at 56 to the hanger lever 48 intermediate the ends thereof, said head being provided with the brake shoe 58 adapted to have braking cooperation with the periphery of the adjacent wheel.

The brake beam 44 is pivotally connected as at 60 inboard of the side frame to the pull rod 62, made adjustable by means of the turnbuckle 64, the other end of said pull rod 62 being pivotally connected as at 66 to the dead lever 68 intermediate the ends of said dead lever. The lower end of said dead lever 68 is pivotally connected as at 70 to the bracket 72 provided on the inner wing casting 34 below the axle, the lever 68 being disposed outwardly of the axle and on the opposite side of said axle from the dead hanger lever 48. The upper end of said dead lever 68 is pivotally connected as at 74 to the piston 76 of the operating cylinder 78, said operating cylinder being connected as by means of the bolts 80 to the inner wing casting 34.

In this construction, two cylinders are provided for operation of the brakes of each wheel and axle assembly, one disposed on the inner wing casting at each end of the truck. In the operation of this form of brake mechanism, movement of the piston toward the adjacent end of the truck moves the upper end of the dead lever 68 about the pivot 70, causing movement of the pull rod 62 to apply the brake shoes 58 to the inner periphery of the wheel of the wheel and axle assembly. Release of the brake fluid in the cylinders operates the piston rod in a reverse direction to release the brakes from braking cooperation with the wheels.

Referring now more particularly to the construction illustrated in Figures 3, 4 and 11, the brake beam 82 is disposed adjacent the inner periphery of the wheel and axle assembly 28 and is provided adjacent the outer ends thereof with the brake heads 84 non-rotatably secured thereto, said brake heads 84 being provided with brake shoes 86 adapted to have braking cooperation with the inner periphery of the associated wheel. The brake heads are pivotally connected as at 88 to the hanger link 90, the upper end of said hanger link being pivotally connected as at 92 to the bracket 94 provided on the outer wing casting 36.

The pull rod 96 is pivotally connected as at 98 to the brake beam 82 inwardly of the side frame, the pull rod 96 being adjustable by means of the turnbuckle 100, the other end of said pull rod being pivotally connected as at 102 to the dead lever 104 intermediate the ends of said lever. The lever 104 is pivotally connected adjacent the lower end thereof as at 106 to the bracket 108 provided on the inner wing casting 34. The upper end of said dead lever 104 is pivotally connected as at 110 to the piston 112 of the operating cylinder 114, said operating cylinder being secured as at 116 to the inner wing casting 34.

As before, a brake cylinder 114 is secured to each inner wing casting so that two operating cylinders are provided for operation of the brakes of each wheel and axle assembly. Movement of the piston 112 in an outboard direction toward the adjacent end of the truck causes pivotal movement of the lever 104 about the pivot 106 whereby the pull rod 96 is caused to move the brake beam 82 to apply the brake shoe 86 to the periphery of the associated wheel of the adjacent wheel and axle assembly. Release movement occurs in an opposite direction upon retraction of the piston due to release of the brake fluid.

Referring now to the constructions illustrated in Figures 5 to 9 and 12, clasp brake systems are shown. In these forms of the brake arrangement, the brake cylinder 118 is connected as at 120 to the inner wing casting 34 inwardly of the adjacent axle of the wheel and axle assembly. The piston rod 122 operates outwardly toward the adjacent end of the truck and is pivotally connected as at 124 to the upper end of the live lever 126, said piston and cylinder forming a support for the lever 126, the piston preferably being of the well known guided push rod type. The lower end of said live lever is pivotally connected as at 128 to the fulcrum 130, the fulcrum being secured as at 132 to the outer brake beam.

In the constructions shown in Figures 5 to 8 and 12, the outer brake beam 134 is pivotally connected as at 136 to the lower end of the hanger lever 138, the upper end of said hanger lever being pivotally connected as at 140 to the bracket 142 provided on the outer wing casting 36. The hanger lever 138 is pivotally connected intermediate the ends thereof as at 144 to the outer brake head 146 provided with the brake shoe 148 adapted to have braking cooperation with the outer periphery of the adjacent wheel.

Referring now more particularly to the construction illustrated in Figures 5, 6 and 12, the pull rod 150 is pivotally connected as at 152 to the live lever 126 intermediate the ends of said lever, said pull rod being adjustable by means of the turnbuckle 154 and having the other end thereof pivotally connected as at 156 to the dead lever 158 intermediate the ends of said lever. The upper end of said dead lever is pivotally connected as at 160 to the bracket 162 provided on the inner wing casting 34. The lower end of the dead lever 158 is pivotally connected as at 164 to the fulcrum 166, said fulcrum being secured as at 168 to the inner brake beam 170. Said inner brake beam 170 is pivotally connected as at 172 to the lower end of the dead hanger lever 174, the upper end thereof being pivotally connected as at 176 to the bracket 178 provided on the outer wing casting 36. The hanger lever 174 is pivotally connected as at 180 intermediate the ends thereof to the inner brake head 182, said brake head being provided with a brake shoe 184 adapted to have braking cooperation with the inner periphery of the adjacent wheel.

As before, a brake cylinder is secured to each inner wing casting so that two operating cylinders are provided for operation of the brakes of each wheel and axle assembly. In operation of this form of the invention, movement of the piston 122 outwardly or toward the adjacent end causes movement of the live lever 126 to operate the pull rod 150, thus causing pivotal movement of the dead lever 158 around its pivot 160 to apply the inner brake shoe 184 to the inner periphery of the adjacent wheel.

The live lever 126 also has pivotal movement about its pivot 152 to cause the outer brake shoe 148 to have braking cooperation with the outer periphery of the adjacent wheel. Release of the braking fluid causes retraction of the piston 122 to release the brakes in an opposite direction from that applying the brakes.

Referring now to the construction illustrated in Figure 7, the pull rod 186 is pivotally connected as at 188 to the live lever 126 intermediate the ends thereof, said pull rod 186 being adjustable by means of the turnbuckle 190 and having the inner end of said pull rod connected directly to the inner brake beam 192 as at 194. The outer end of the brake beam is pivotally connected as at 196 to the hanger lever 198, the upper end of said hanger lever being pivotally connected as at 200 to the bracket 202 provided on the outer wing casting 36. The inner brake head 204 is pivotally connected as at 206 to the hanger lever 198 intermediate the ends of said lever, said head being provided with the brake shoe 208 adapted to have braking engagement with the inner periphery of the wheel and axle assembly 28.

In operation of this form of the device, outward movement of the piston 122 causes movement of the live lever 126 whereby the pull rod 186 is caused to move the brake beam 192 to apply the brake shoe 208 to the inner periphery of the wheel. The live lever 126 is also caused to have pivotal movement about the pivot 188, thus causing inward movement of the outer brake shoe 148 to braking cooperation with the periphery of the adjacent wheel. Release of the braking fluid causes release of the brake shoes in an opposite direction to that applying the brake shoes.

Referring now to the construction illustrated in Figure 8, the pull rod 210 is pivotally connected as at 212 to the live lever 126 intermediate the ends of said lever, the pull rod being adjustable by means of the turnbuckle 214, the other end of said pull rod being directly connected as at 216 to the brake beam 218, said brake beam being fixedly connected to the inner brake head 220, such as described in the modification illustrated in Figures 3, 4 and 10.

The brake head is provided with the brake shoe 222 adapted to have braking cooperation with the periphery of the adjacent wheel of the wheel and axle assembly 28. The brake head is pivotally connected as at 224 to the hanger 226 which is pivotally connected as at 228 to the bracket 230 provided on the outer wing casting 36.

Movement of the piston 122 outwardly toward the adjacent end of the truck causes movement of the live lever 126 whereby the pull rod 210 is caused to move the brake beam 218 to apply the brake shoe 222 to the periphery of the wheel. The live lever 126 is also caused to rotate about the pivot 212 whereby the outer brake shoe 148 is caused to have braking cooperation with the periphery of the wheel. Retraction of the brake piston causes release of the brake rigging in a direction opposite to that of applied movement.

In the construction illustrated in Figure 9, the fulcrum 130 is connected to the outer brake beam 232, said brake head being fixedly connected to the brake head 234 provided with the wheel periphery engaging shoe 236. The brake head is pivotally connected as at 238 to the hanger 240, the upper end of which is pivotally connected as at 242 to the bracket 244 provided on the outer wing casting 36. The live lever 126 is pivotally connected intermediate the ends thereof as at 246 to the pull rod 248, said pull rod being made adjustable by means of the turnbuckle 250. The inner end of said pull rod is connected as at 252 to the inner brake beam 254, said brake beam being fixedly connected to the inner brake head 256 provided with the brake shoe 258. The inner brake head is pivotally connected as at 260 to the hanger 262, said hanger being pivotally connected as at 264 adjacent the upper end thereof to the bracket 266 provided on the outer wing casting 36.

As before, there are two cylinders provided to operate the brakes of each wheel and axle assembly, being mounted on each inner wing casting. In operation of this form of the invention, movement of the piston rod 122 outwardly toward the adjacent end of the truck causes outward movement of the upper end of the live lever 126 whereby the pull rod 248 is caused to move the brake shoe 258 into braking engagement with the inner periphery of the wheel. The live lever 126 is also pivotally moved with respect to the pivot 246 whereby the outer brake beam 232 is caused to be moved inwardly whereby the brake shoe 236 engages the periphery of the wheel for braking operation. Release of the brake fluid causes retraction of the piston 122 to release the brakes in a direction opposed to that of applied movement.

As far as the unit cylinder brakes are concerned, it is of course appreciated that outboard trucks may be used and/or trucks where no wing castings are utilized, in which case the brake cylinder and brake rigging will be directly carried by the side frame or truck frame, and it is to be further understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a brake arrangement, the combination of a truck frame, a wheel and axle assembly disposed in supporting relation thereto, brake beams disposed on opposite sides of the wheel, dead hanger levers pivotally connected adjacent the lower ends to said brake beams and pivoted adjacent the upper ends with respect to said frame, a brake head pivoted to each of said dead levers intermediate the ends of said levers, each of the brake heads having a shoe adapted to have braking cooperation with said wheel, a dead lever pivotally connected to one of said brake beams adjacent the lower end of said lever and pivoted adjacent the upper end with respect to said frame, said lever being disposed on one side of the axle, a live lever disposed on the opposite side of said axle and having a connection to said last named dead lever intermediate the ends thereof, a pivotal connection between said live lever adjacent the lower end thereof and the other brake beam, an operating cylinder supported with respect to said frame and having a piston operatively connected to the upper end of said live lever.

2. In a brake arrangement, the combination of a truck frame, a wheel and axle assembly disposed in supporting relation thereto, brake beams disposed on opposite sides of the wheel, dead hanger levers pivotally connected adjacent the lower ends to said brake beams and pivoted adjacent the upper ends with respect to said frame, a brake head pivoted to each of said dead hanger levers intermediate the ends of said hanger levers, each of the brake heads having a shoe adapted to have braking cooperation with said wheel, a live lever disposed on one side of said axle and having a direct pull rod connection to the lower end of the dead hanger lever disposed at the opposite side of said axle, a pivotal connection between said live lever adjacent the lower end thereof and the adjacent brake beam, and an operating cylinder supported with respect to said frame and having a piston operatively connected to the upper end of said live lever.

3. In a brake arrangement, the combination of a truck frame, a wheel and axle assembly disposed in supporting relation thereto, brake beams disposed on opposite sides of the wheel, a dead hanger lever pivotally connected adjacent the lower end thereof to the outer brake beam and pivoted adjacent the upper end thereof with respect to said frame, a brake head pivoted to said outer hanger lever, a brake head fixed to the inner brake beam, a hanger connected to said last named head and pivoted with respect to said side frame, a pull rod connected to the inner brake beam, a live lever pivotally connected intermediate the ends thereof to said pull rod and the lower end thereof to said outer brake beam, and an operating cylinder supported with respect to said side frame and having the piston thereof pivotally connected to the upper end of said live lever.

4. In a brake arrangement, the combination of a truck having a side frame, a plurality of wing members connected thereto, a brake operating cylinder secured to one of said wing members, and brake rigging secured to another of said wing members and operatively connected to said brake operating cylinder.

5. In a brake arrangement, the combination of a truck having a side frame, a wing casting yieldably connected to the inner side thereof, a wing casting yieldably connected to the outer side of said side frame, a brake operating cylinder secured to the inner wing casting, and brake rigging supported by both of said wing castings and being operatively connected to said cylinder.

6. In a brake arrangement, the combination of a truck having a side frame, a journal box, a wheel and axle assembly the journal end of which is disposed in cooperative relation to said journal box, wing castings on opposite sides of said side frame and resting upon said journal box, a brake operating cylinder carried by one of said wing castings, brake mechanism supported by said wing castings and operatively connected to said cylinder and including a brake adapted to be applied to said wheel, and flexible connections between said side frame and wing castings for permitting relative movement therebetween without disturbing the relative positions of the brake mechanism with respect to said wheel.

7. In a brake arrangement, the combination of a truck having a side frame and wheel, wing means resiliently connected to said side frame, brakes supported by said wing means and adapted to be applied to opposite sides of said wheel, and a brake operating cylinder secured to said wing means and being operatively connected to said brakes.

8. In a brake arrangement, the combination of a side frame, a wheel and axle assembly disposed in supporting relation to said side frame, dead hanger levers disposed outboard of said side frame and on each side of the periphery of said wheel, a brake head pivotally connected to each of said hanger levers intermediate the ends thereof and provided with a brake shoe adapted to have braking cooperation with the periphery of said wheel, brake means connected to the lower ends of each of said hanger levers, a substantially vertically disposed dead truck lever disposed inboard of said side frame adjacent one of said hanger levers and pivotally supported adjacent the upper end thereof adjacent the side frame, a connection between the lower end of said truck lever and the adjacent brake beam, a live cylinder lever disposed on the opposite side of said axle from said truck lever, a connection disposed below said axle and pivotally connected to said truck lever and said cylinder lever intermediate the ends thereof, a connection between the lower end of said cylinder lever and the other of said brake beams, and an operating cylinder supported adjacent said side frame and having a piston pivotally connected to the upper end of said live cylinder lever.

9. In a brake arrangement, the combination of a side frame, a wheel and axle assembly disposed in supporting relation to said side frame, dead hanger levers supported at the upper ends adjacent the said side frame outboard of said side frame and on each side of said wheel, brake heads pivoted to said hanger levers intermediate the ends thereof and provided with brake shoes adapted to have braking cooperation with said wheel, inner and outer brake beams connected to the lower ends of said hanger levers, a substantially vertically disposed live cylinder lever disposed adjacent the outer of said brake beams, a connection between the lower end of said live cylinder lever and said outer brake beam, a connection below said axle between the inner of said brake beams and the live cylinder lever intermediate the ends of said cylinder lever and an operating cylinder having a piston pivotally connected to said live cylinder lever adjacent the upper end thereof.

10. In a brake arrangement, the combination of a side frame, a wheel and axle assembly disposed in supporting relation to said side frame, inner and outer brake beams disposed on opposite sides of said wheel, a dead hanger lever connected to said outer brake beam adjacent the lower end of said lever, the upper end of said lever being pivotally supported adjacent said side frame, a brake head pivotally connected to said hanger lever intermediate the ends thereof, a brake head connected to the inner of said brake beams, said brake heads being provided with brake shoes adapted to have braking cooperation with said wheel, a hanger connected adjacent the lower end thereof to the inner brake head and pivotally supported adjacent the upper end thereof adjacent said side frame, a substantially vertically disposed live cylinder lever adjacent said outer brake beam and disposed inboard of said side frame, the lower end of said cylinder lever being connected to said outer brake beam, a connection between the inner brake beam and said cylinder lever below said axle and intermediate the ends of said cylinder lever and an operating cylinder supported adjacent said side frame and provided with a piston pivotally connected to said cylinder lever adjacent the upper ends thereof.

11. In a brake arrangement, the combination of a side frame, a wheel and axle assembly disposed in supporting relation to said side frame, inner and outer brake beams disposed on opposite sides of said wheel, a dead hanger lever connected to said outer brake beam adjacent the lower end of said lever and disposed outboard of said side frame, the upper end of said lever being pivotally supported adjacent said side frame, a brake head pivotally connected to said hanger lever intermediate the ends thereof, a brake head connected to the inner of said brake beams, said brake heads being provided with brake shoes adapted to have braking cooperation with said wheel, a hanger connected adjacent the lower end thereof to the inner brake head and pivotally supported adjacent the upper end thereof adjacent said side frame, a substantially vertically disposed live cylinder lever adjacent said outer brake beam and disposed inboard of said side frame, the lower end of said cylinder lever being connected to said outer brake beam, a connection between the inner brake beam and said cylinder lever below said axle and intermediate the ends of said cylinder lever and an operating cylinder supported adjacent said side frame and provided with a piston pivotally connected to said cylinder lever adjacent the upper ends thereof.

12. In a brake arrangement, the combination of a wheel and axle assembly, a truck frame member supported by said wheel and axle assembly, a brake head pivotally and movably supported adjacent the wheel for braking cooperation therewith, a second brake head pivotally and movably supported adjacent said wheel for braking cooperation therewith, a brake cylinder having a piston rod, a substantially vertically disposed cylinder lever operatively connected to said brake heads, said cylinder lever being pivoted to said piston rod adjacent the upper end of said lever.

13. In a brake arrangement, the combination of a wheel and axle assembly, a truck frame member supported by said wheel and axle assembly, a brake head pivotally and movably supported adjacent the wheel for braking cooperation therewith, a second brake head pivotally and movably supported adjacent said wheel for braking cooperation therewith, a brake cylinder having a substantially horizontally disposed piston rod, a substantially vertically disposed cylinder lever operatively connected to said brake heads, said cylinder lever being pivoted to said piston rod adjacent the upper end of said lever.

14. In a brake arrangement, the combination of a wheel and axle assembly, a truck frame member supported by said wheel and axle assembly, a brake head pivotally and movably supported adjacent the wheel for braking cooperation therewith, a second brake head pivotally and movably supported adjacent said wheel for braking cooperation therewith, a brake cylinder having a piston rod, a substantially vertically disposed cylinder lever operatively connected to said brake heads, the connection between said lever and the closer of said brake heads being pivoted to said lever adjacent the lower end thereof, and the connection to the farther of said brake heads being pivoted to said lever intermediate the ends thereof, said last named connection extending below said axle, said cylinder lever being pivoted to said piston rod adjacent the upper end of said lever.

15. In a brake arrangement, the combination of a wheel and axle assembly, a truck frame member supported by said wheel and axle assembly, a brake head pivotally and movably supported adjacent the wheel for braking cooperation therewith, a second brake head pivotally and movably supported adjacent said wheel for braking cooperation therewith, a brake cylinder having a piston rod, a substantially vertically disposed cylinder lever operatively connected to said brake heads, the connection between said lever and the closer of said brake heads being pivoted to said lever adjacent the lower end thereof, and the connection to the farther of said brake heads being pivoted to said lever intermediate the ends thereof, said cylinder lever being pivoted to said piston rod adjacent the upper end of said lever.

16. In a brake arrangement, the combination of a wheel and axle assembly, a truck frame member supported by said wheel and axle assembly, a brake head pivotally and movably supported adjacent the wheel for braking cooperation therewith, a second brake head pivotally and movably supported adjacent said wheel for braking cooperation therewith, a brake cylinder having a substantially horizontally disposed piston rod, a substantially vertically disposed cylinder lever operatively connected to said brake heads, the connection between said lever and the closer of said brake heads being pivoted to said lever adjacent the lower end thereof, and the connection to the farther of said brake heads being pivoted to said lever intermediate the ends thereof, said last named connection extending below said axle, said cylinder lever being pivoted to said piston rod adjacent the upper end of said lever.

17. In a brake arrangement, the combination of a wheel and axle assembly, a truck frame member supported by said wheel and axle assembly, a brake head pivotally and movably supported adjacent the wheel for braking cooperation therewith, a second brake head pivotally and movably supported adjacent said wheel for braking cooperation therewith, a brake cylinder having a substantially horizontally disposed piston rod, a substantially vertically disposed cylinder lever operatively connected to said brake heads, the connection between said lever and the closer of said brake heads being pivoted to said lever adjacent the lower end thereof, and the connection to the farther of said brake heads being pivoted to said lever intermediate the ends thereof, said cylinder lever being pivoted to said piston rod adjacent the upper end of said lever.

18. In a brake arrangement, the combination of a wheel and axle assembly, a truck frame member supported by said wheel and axle assembly, a brake head pivotally and movably supported adjacent the wheel for braking cooperation therewith, a second brake head pivotally and movably supported adjacent said wheel for braking cooperation therewith, a brake cylinder having a piston rod, a substantially vertically disposed cylinder lever disposed adjacent one of said brake heads, a substantially vertically disposed dead lever disposed adjacent the other of said brake heads, a connection between the lower end of said cylinder lever and its adjacent brake head, a connection between the lower end of said dead lever and its adjacent brake head, and a connection between said cylinder and dead levers disposed below said axle and pivotally connected to said cylinder and dead levers intermediate the ends of said levers.

19. In a brake arrangement, the combination of a wheel and axle assembly, a truck frame member supported by said wheel and axle assembly, a brake head pivotally and movably supported adjacent the wheel for braking cooperating therewith, a second brake head pivotally and movably supported adjacent said wheel for braking cooperation therewith, a brake cylinder having a piston rod, a substantially vertically disposed cylinder lever disposed adjacent one of said brake heads, a substantially vertically disposed dead lever disposed adjacent the other of said brake heads, a connection between the lower end of said cylinder lever and its adjacent brake head, a connection between the lower end of said dead lever and its adjacent brake head, and a connection between said cylinder and dead levers pivotally connected to said cylinder and dead levers intermediate the ends of said levers.

20. In a brake arrangement, the combination of a wheel and axle assembly, a truck frame member supported by said assembly, a brake head disposed on one side of the wheel, a dead brake hanger pivoted adjacent the lower end thereof to said head, a second brake head disposed on the other side of the wheel, a dead brake hanger lever pivoted intermediate the ends thereof to said second head, a brake cylinder having a piston, and operative connections between said cylinder, said first brake head and the lower end of said hanger lever.

21. In a brake arrangement, the combination of a wheel and axle assembly, a truck frame member supported by said assembly, a brake head disposed on one side of the wheel, a dead brake hanger pivoted adjacent the lower end thereof to said head, a second brake head disposed on the other side of the wheel, a dead brake hanger lever pivoted intermediate the ends thereof to said second head, a substantially vertically disposed cylinder lever disposed between said axle and second brake head, a connection between the lower ends of said hanger and cylinder levers, a connection between said first named brake head and said cylinder lever pivoted to said lever intermediate the ends thereof, and a brake cylinder having a piston pivoted to the upper end of said cylinder lever.

22. In a brake arrangement, the combination of a wheel and axle assembly, a truck frame member supported by said assembly, a brake head disposed on one side of the wheel, a dead brake hanger lever pivoted intermediate the ends thereof to said head, a second brake head disposed on the other side of said wheel, a second dead brake hanger lever pivoted intermediate the ends thereof to said second brake head, a brake cylinder having a piston, and operative connections between said piston and the lower ends of said brake hanger levers.

23. In a brake arrangement, the combination of a wheel and axle assembly, a truck frame member supported by said assembly, a brake head disposed on one side of the wheel, a dead brake hanger lever pivoted intermediate the ends thereof to said head, a second brake head disposed on the other side of said wheel, a second dead brake hanger lever pivoted intermediate the ends thereof to said second brake head, a substantially vertically disposed dead lever pivoted adjacent the lower end thereof to the lower end of said first hanger lever, a substantially vertically disposed cylinder lever pivoted adjacent the lower end thereof to the lower end of said second hanger lever, a connection between said cylinder and dead levers intermediate the ends thereof and below the axle, and a brake cylinder having a piston pivotally connected to the upper end of said cylinder lever.

24. In a brake arrangement, the combination of a wheel and axle assembly, a truck frame member supported by said assembly, a brake head disposed on one side of the wheel, a dead brake hanger lever pivoted intermediate the ends thereof to said head, a second brake head disposed on the other side of said wheel, a second dead brake hanger lever pivoted intermediate the ends thereof to said second brake head, a dead lever pivoted adjacent the lower end thereof to the lower end of said first hanger lever, a cylinder lever pivoted adjacent the lower end thereof to the lower end of said second hanger lever, a connection between said cylinder and dead levers intermediate the ends thereof, and a brake cylinder having a piston pivotally connected to the upper end of said cylinder lever.

25. In a brake arrangement, the combination of a wheel and axle assembly, a truck frame member supported by said assembly, a brake head disposed on one side of the wheel, a dead brake hanger lever pivoted intermediate the ends thereof to said head, a second brake head disposed on the other side of said wheel, a second dead brake hanger lever pivoted intermediate the ends thereof to said second brake head, a dead lever pivoted adjacent one end thereof to the lower end of said first hanger lever, a cylinder lever pivoted adjacent one end thereof to the lower end of said second hanger lever, a connection between said cylinder and dead levers intermediate the ends thereof, and a brake cylinder having a piston pivotally connected to the other end of said cylinder lever.

26. In a brake arrangement, the combination of a wheel and axle assembly, a truck frame member supported by said assembly, a brake head disposed on one side of the wheel, a dead brake hanger lever pivoted intermediate the ends thereof to said head, a second brake head disposed on the other side of said wheel, a second dead brake hanger lever pivoted intermediate the ends thereof to said second brake head, a cylinder lever pivoted adjacent the lower end thereof to the lower end of said second hanger lever, a substantially direct connection between the lower end of said first hanger lever and said cylinder lever intermediate the ends of said cylinder lever and below the axle, and a brake cylinder having a piston pivotally connected to the upper end of said cylinder lever.

27. In a brake arrangement, the combination of a wheel and axle assembly, a truck frame member supported by said assembly, a brake head disposed on one side of the wheel, a dead brake hanger lever pivoted intermediate the ends thereof to said head, a second brake head disposed on the other side of said wheel, a second dead brake hanger lever pivoted intermediate the ends thereof to said second brake head, a cylinder lever pivoted adjacent the lower end thereof to the lower end of said second hanger lever, a substantially direct connection between said first hanger lever and said cylinder lever intermediate the ends of said cylinder lever, and a brake cylinder having a piston pivotally connected to the upper end of said cylinder lever.

28. In a brake arrangement, the combination of a wheel and axle assembly, a truck frame member supported by said wheel and axle assembly, a brake head pivotally and movably supported adjacent the wheel for braking cooperation therewith, a second brake head pivotally and movably supported adjacent said wheel for braking cooperation therewith, a brake cylinder disposed above said axle and having a piston rod, a substantially vertically disposed cylinder lever operatively connected to said brake heads, said cylinder lever being pivoted to said piston rod adjacent the upper end of said lever.

29. In a brake arrangement, the combination of a wheel and axle assembly, a truck frame member supported by said wheel and axle assembly, a brake head pivotally and movably supported adjacent the wheel for braking cooperation therewith, a second brake head pivotally and movably supported adjacent said wheel for braking cooperation therewith, a brake cylinder disposed above said axle and having a piston rod, a substantially vertically disposed cylinder lever operatively connected to said brake heads, the connection between said lever and the closer of said brake heads being pivoted to said lever adjacent the lower end thereof, and the connection to the farther of said brake heads being pivoted to said lever intermediate the ends thereof, said last named connection extending below said axle, said cylinder lever being pivoted to said piston rod adjacent the upper end of said lever.

30. In a brake arrangement, the combination of a wheel and axle assembly, a truck frame member supported by said wheel and axle assembly, a brake head pivotally and movably supported adjacent the wheel for braking cooperation therewith, a second brake head pivotally and movably supported adjacent said wheel for braking cooperation therewith, a brake cylinder disposed above said axle and having a piston rod, a substantially vertically disposed cylinder lever disposed between said brake heads and adjacent one of said brake heads, a substantially vertically disposed dead lever disposed between said brake heads and adjacent the other of said brake heads, a connection between the lower end of said cylinder lever and its adjacent brake head, a connection between the lower end of said dead lever and its adjacent brake head, and a connection between said cylinder and dead levers disposed below said axle and pivotally connected to said cylinder and dead levers intermediate the ends of said levers.

31. In a brake arrangement, the combination of a wheel and axle assembly, a truck frame member supported by said wheel and axle assembly, a brake head pivotally and movably supported adjacent the wheel for braking cooperation therewith, a second brake head pivotally and movably supported adjacent said wheel for braking cooperation therewith, a brake cylinder disposed above said axle and having a piston rod, a substantially vertically disposed cylinder lever disposed between said brake heads and adjacent one of said brake heads, a substantially vertically disposed dead lever disposed between said brake heads and adjacent the other of said brake heads, a connection between the lower end of said cylinder lever and its adjacent brake head, a connection between the lower end of said dead lever and its adjacent brake head, a connection between said cylinder and dead levers pivotally connected to said cylinder and dead levers intermediate the ends of said levers.

32. In a brake arrangement, the combination of a wheel and axle assembly, a truck frame member supported by said assembly, a brake head disposed on one side of the wheel, a dead brake hanger pivoted adjacent the lower end thereof to said head, a second brake head disposed on the other side of the wheel, a dead brake hanger lever pivoted intermediate the ends thereof to said second head, a brake cylinder disposed above said axle and having a piston, and operative connections between said cylinder, said first brake head and the lower end of said hanger lever.

33. In a brake arrangement, the combination of a wheel and axle assembly, a truck frame member supported by said assembly, a brake head disposed on one side of the wheel, a dead brake hanger pivoted adjacent the lower end thereof to said head, a second brake head disposed on the other side of the wheel, a dead brake hanger lever pivoted intermediate the ends thereof to said second head, a substantially vertically disposed cylinder lever disposed between said axle and second brake head, a connection between the lower ends of said hanger and cylinder levers, a connection between said first named brake head and said cylinder lever pivoted to said lever intermediate the ends thereof, and a brake cylinder disposed above said axle and having a piston pivoted to the upper end of said cylinder lever.

34. In a brake arrangement, the combination of a wheel and axle assembly, a truck frame member supported by said assembly, a brake head disposed on one side of the wheel, a dead brake hanger lever pivoted intermediate the ends thereof to said head, a second brake head disposed on the other side of said wheel, a second dead brake hanger lever pivoted intermediate the ends thereof to said second brake head, a brake cylinder disposed above said axle and having a piston, and operative connections between said piston and the lower ends of said brake hanger levers.

35. In a brake arrangement, the combination of a wheel and axle assembly, a truck frame member supported by said assembly, a brake head disposed on one side of the wheel, a dead brake hanger lever pivoted intermediate the ends thereof to said head, a second brake head disposed on the other side of said wheel, a second dead brake hanger lever pivoted intermediate the ends thereof to said second brake head, a substantially vertically disposed dead lever pivoted adjacent the lower end thereof to the lower end of said first hanger lever, a substantially vertically disposed cylinder lever pivoted adjacent the lower end thereof to the lower end of said second hanger lever, a connection between said cylinder and dead levers intermediate the ends thereof and below the axle, and a brake cylinder disposed above said axle and having a piston pivotally connected to the upper end of said cylinder lever.

36. In a brake arrangement, the combination of a wheel and axle assembly, a truck frame member supported by said assembly, a brake head disposed on one side of the wheel, a dead brake hanger lever pivoted intermediate the ends thereof to said head, a second brake head disposed on the other side of said wheel, a second dead brake hanger lever pivoted intermediate the ends thereof to said second brake head, a cylinder lever pivoted adjacent the lower end thereof to the lower end of said second hanger lever, a substantially direct connection between the lower end of said first hanger lever and said cylinder lever intermediate the ends of said cylinder lever and below the axle, and a brake cylinder disposed above said axle and having a piston pivotally connected to the upper end of said cylinder lever.

37. In a brake arrangement, the combination of a wheel and axle assembly, a truck frame member supported by said assembly, a brake head disposed on one side of the wheel, a dead brake hanger lever pivoted intermediate the ends thereof to said head, a second brake head disposed on the other side of said wheel, a second dead brake hanger lever pivoted intermediate the ends thereof to said second brake head, a cylinder lever pivoted adjacent the lower end thereof to the lower end of said second hanger lever, a substantially direct connection between said first hanger lever and said cylinder lever intermediate the ends of said cylinder lever, and a brake cylinder disposed above said axle and having a piston pivotally connected to the upper end of said cylinder lever.

38. In a brake arrangement, the combination of a wheel and axle assembly, a truck frame member supported by said wheel and axle assembly and disposed inboard of the wheel, a brake head pivotally and movably supported adjacent the wheel for braking cooperation therewith, a second brake head pivotally and movably supported adjacent said wheel for braking cooperation therewith, a brake cylinder disposed above said axle inboard of said frame member and having a piston rod, a substantially vertically disposed cylinder lever operatively connected to said brake heads, said cylinder lever being pivoted to said piston rod adjacent the upper end of said lever.

39. In a brake arrangement, the combination of a wheel and axle assembly, a truck frame member supported by said wheel and axle assembly and disposed inboard of the wheel, a brake head pivotally and movably supported adjacent the wheel for braking cooperation therewith, a second brake head pivotally and movably supported adjacent said wheel for braking cooperation therewith, a brake cylinder disposed above said axle inboard of said frame member and having a piston rod, a substantially vertically disposed cylinder lever operatively connected to said brake heads, the connection between said lever and the closer of said brake heads being pivoted to said lever adjacent the lower end thereof, and the connection to the farther of said brake heads being pivoted to said lever intermediate the ends thereof, said last named connection extending below said axle, said cylinder lever being pivoted to said piston rod adjacent the upper end of said lever.

40. In a brake arrangement, the combination of a wheel and axle assembly, a truck frame member supported by said wheel and axle assembly and disposed inboard of the wheel, a brake head pivotally and movably supported adjacent the wheel for braking cooperation therewith, a second brake head pivotally and movably supported adjacent said wheel for braking cooperation therewith, a brake cylinder disposed above said axle inboard of said frame member and having a piston rod, a substantially vertically disposed cylinder lever adjacent one of said brake heads, a substantially vertically disposed dead lever adjacent the other of said brake heads, a connection between the lower end of said cylinder lever and its adjacent brake head, a connection between the lower end of said dead lever and its adjacent brake head, and a connection between said cylinder and dead levers disposed below said axle and pivotally connected to said cylinder and dead levers intermediate the ends of said levers.

41. In a brake arrangement, the combination of a wheel and axle assembly, a truck frame member supported by said wheel and axle assembly and disposed inboard of the wheel, a brake head pivotally and movably supported adjacent the wheel for braking cooperation therewith, a second brake head pivotally and movably supported adjacent said wheel for braking cooperation therewith, a brake cylinder disposed above said axle inboard of said frame member and having a piston rod, a substantially vertically disposed cylinder lever adjacent one of said brake heads, a substantially vertically disposed dead lever adjacent the other of said brake heads, a connection between the lower end of said cylinder lever and its adjacent brake head, a connection between the lower end of said dead lever and its adjacent brake head, and a connection between said cylinder and dead levers pivotally connected to said cylinder and dead levers intermediate the ends of said levers.

42. In a brake arrangement, the combination of a wheel and axle assembly, a truck frame member supported by said assembly and disposed inboard of the wheel, a brake head disposed on one side of the wheel, a dead brake hanger pivoted adjacent the lower end thereof to said head, a second brake head disposed on the other side of the wheel, a dead brake hanger lever pivoted intermediate the ends thereof to said second head, a brake cylinder disposed above said axle inboard of said frame member and having a piston, and operative connections between said cylinder, said first brake head and the lower end of said hanger lever.

43. In a brake arrangement, the combination of a wheel and axle assembly, a truck frame member supported by said assembly and disposed inboard of the wheel, a brake head disposed on one side of the wheel, a dead brake hanger pivoted adjacent the lower end thereof to said head, a second brake head disposed on the other side of the wheel, a dead brake hanger lever pivoted intermediate the ends thereof to said second head, a substantially vertically disposed cylinder lever disposed between said axle and second brake head, a connection between the lower ends of said hanger and cylinder levers, a connection between said first named brake head and said cylinder lever pivoted to said lever intermediate the ends thereof, and a brake cylinder disposed above said axle inboard of said frame member and having a piston pivoted to the upper end of said cylinder lever.

44. In a brake arrangement, the combination of a wheel and axle assembly, a truck frame member supported by said assembly and disposed inboard of the wheel, a brake head disposed on one side of the wheel, a dead brake hanger lever pivoted intermediate the ends thereof to said head, a second brake head disposed on the other side of said wheel, a second dead brake hanger lever pivoted intermediate the ends thereof to said second brake head, a brake cylinder disposed above said axle inboard of said frame member and having a piston, and operative connections between said piston and the lower ends of said brake hanger levers.

45. In a brake arrangement, the combination of a wheel and axle assembly, a truck frame member supported by said assembly and disposed inboard of the wheel, a brake head disposed on one side of the wheel, a dead brake hanger lever pivoted intermediate the ends thereof to said head, a second brake head disposed on the other side of said wheel, a second dead brake hanger lever pivoted intermediate the ends thereof to said second brake head, a substantially vertically disposed dead lever pivoted adjacent the lower end thereof to the lower end of said first hanger lever, a substantially vertically disposed cylinder lever pivoted adjacent the lower end thereof to the lower end of said second hanger lever, a connection between said cylinder and dead levers intermediate the ends thereof and below the axle, and a brake cylinder disposed above said axle inboard of said frame member and having a piston pivotally connected to the upper end of said cylinder lever.

46. In a brake arrangement, the combination of a wheel and axle assembly, a truck frame member supported by said assembly and disposed inboard of the wheel, a brake head disposed on one side of the wheel, a dead brake hanger lever pivoted intermediate the ends thereof to said head, a second brake head disposed on the other side of said wheel, a second dead brake hanger lever pivoted intermediate the ends thereof to said second brake head, a cylinder lever pivoted adjacent the lower end thereof to the lower end of said second hanger lever, a substantially direct connection between the lower end of said first hanger lever and said cylinder lever intermediate the ends of said cylinder lever and below the axle, and a brake cylinder disposed above said axle inboard of said frame member and having a piston pivotally connected to the upper end of said cylinder lever.

47. In a brake arrangement, the combination of a wheel and axle assembly, a truck frame member supported by said assembly and disposed inboard of the wheel, a brake head disposed on one side of the wheel, a dead brake hanger lever pivoted intermediate the ends thereof to said head, a second brake head disposed on the other side of said wheel, a second dead brake hanger lever pivoted intermediate the ends thereof to said second brake head, a cylinder lever pivoted adjacent the lower end thereof to the lower end of said second hanger lever, a substantially direct connection between said first hanger lever and said cylinder lever intermediate the ends of said cylinder lever, and a brake cylinder disposed above said axle inboard of said frame member and having a piston pivotally connected to the upper end of said cylinder lever.

48. In a brake arrangement, the combination of a wheel and axle assembly, a truck frame member supported by said wheel and axle assembly and disposed inboard of the wheel, a brake head pivotally and movably supported adjacent the wheel for braking cooperation therewith, a second brake head pivotally and movably supported adjacent said wheel for braking cooperation therewith, a brake cylinder disposed above and to one side of said axle inboard of said frame member and having a piston rod, a substantially vertically disposed cylinder lever at the opposite side of the axle from said cylinder and operatively connected thereto, said cylinder lever being pivoted to said piston rod adjacent the upper end of said lever.

49. In a brake arrangement, the combination of a wheel and axle assembly, a truck frame member supported by said wheel and axle assembly and disposed inboard of the wheel, a brake head pivotally and movably supported adjacent the wheel for braking cooperation therewith, a second brake head pivotally and movably supported adjacent said wheel for braking cooperation therewith, a brake cylinder disposed above and to one side of said axle inboard of said frame member and having a piston rod, a substantially vertically disposed cylinder lever at the opposite side of the axle from said cylinder and operatively connected thereto, the connection between said lever and the closer of said brake heads being pivoted to said lever adjacent the lower end thereof, and the connection to the farther of said brake heads being pivoted to said lever intermediate the ends thereof, said last named connection extending below said axle, said cylinder lever being pivoted to said piston rod adjacent the upper end of said lever.

50. In a brake arrangement, the combination of a wheel and axle assembly, a truck frame member supported by said wheel and axle assembly and disposed inboard of the wheel, a brake head pivotally and movably supported adjacent the wheel for braking cooperation therewith, a second brake head pivotally and movably supported adjacent said wheel for braking cooperation therewith, a brake cylinder disposed above and to one side of said axle inboard of said frame member and having a piston rod, a substantially vertically disposed cylinder lever at the opposite side of the axle from said cylinder and adjacent one of said brake heads, a substantially vertically disposed dead lever adjacent the other of said brake heads, a connection between the lower end of said cylinder lever and its adjacent brake head, a connection between the lower end of said dead lever and its adjacent brake head, and a connection between said cylinder and dead levers disposed below said axle and pivotally connected to said cylinder and dead levers intermediate the ends of said levers.

51. In a brake arrangement, the combination of a wheel and axle assembly, a truck frame member supported by said wheel and axle assembly and disposed inboard of the wheel, a brake head pivotally and movably supported adjacent the wheel for braking cooperation therewith, a second brake head pivotally and movably supported adjacent said wheel for braking cooperation therewith, a brake cylinder disposed above and to one side of said axle inboard of said frame member and having a piston rod, a substantially vertically disposed cylinder lever at the opposite side of the axle from said cylinder and adjacent one of said brake heads, a substantially vertically disposed dead lever adjacent the other of said brake heads, a connection between the lower end of said cylinder lever and its adjacent brake head, a connection between the lower end of said dead lever and its adjacent brake head, and a connection between said cylinder and dead levers pivotally connected to said cylinder and dead levers intermediate the ends of said levers.

52. In a brake arrangement, the combination of a wheel and axle assembly, a truck frame member supported by said assembly and disposed inboard of the wheel, a brake head disposed on one side of the wheel, a dead brake hanger pivoted adjacent the lower end thereof to said head, a second brake head disposed on the other side of the wheel, a dead brake hanger lever pivoted intermediate the ends thereof to said second head, a substantially vertically disposed cylinder lever disposed between said axle and second brake head and to one side of said axle, a connection between the lower ends of said hanger and cylinder levers, a connection between said first named brake head and said cylinder lever pivoted to said lever intermediate the ends thereof, and a brake cylinder disposed above said axle inboard of said frame member and at the opposite side of said axle from said cylinder lever and having a piston pivoted to the upper end of said cylinder lever.

53. In a brake arrangement, the combination of a wheel and axle assembly, a truck frame member supported by said assembly and disposed inboard of the wheel, a brake head disposed on one side of the wheel, a dead brake hanger lever pivoted intermediate the ends thereof to said head, a second brake head disposed on the other side of said wheel, a second dead brake hanger lever pivoted intermediate the ends thereof to said second brake head, a substantially vertically disposed dead lever pivoted adjacent the lower end thereof to the lower end of said first hanger lever, a substantially vertically disposed cylinder lever pivoted adjacent the lower end thereof to the lower end of said second hanger lever and to one side of said axle, a connection between said cylinder and dead levers intermediate the ends thereof and below the axle, and a brake cylinder disposed above said axle inboard of said frame member and at the opposite side of said axle from said cylinder lever and having a piston pivotally connected to the upper end of said cylinder lever.

54. In a brake arrangement, the combination of a wheel and axle assembly, a truck frame member supported by said assembly and disposed inboard of the wheel, a brake head disposed on one side of the wheel, a dead brake hanger lever pivoted intermediate the ends thereof to said head, a second brake head disposed on the other side of said wheel, a second dead brake hanger lever pivoted intermediate the ends thereof to said second brake head, a cylinder lever pivoted adjacent the lower end thereof to the lower end of said second hanger lever and to one side of said axle, a substantially direct connection between the lower end of said first hanger lever and said cylinder lever intermediate the ends of said cylinder lever and below the axle, and a brake cylinder disposed above said axle inboard of said frame member and at the opposite side of said axle from said cylinder lever and having a piston pivotally connected to the upper end of said cylinder lever.

55. In a brake arrangement, the combination of a wheel and axle assembly, a truck frame member supported by said assembly and disposed inboard of the wheel, a brake head disposed on one side of the wheel, a dead brake hanger lever pivoted intermediate the ends thereof to said head, a second brake head disposed on the other side of said wheel, a second dead brake hanger lever pivoted intermediate the ends thereof to said second brake head, a cylinder lever pivoted adjacent the lower end thereof to the lower end of said second hanger lever and to one side of said axle, a substantially direct connection between said first hanger lever and said cylinder lever intermediate the ends of said cylinder lever, and a brake cylinder disposed above said axle inboard of said frame member and at the opposite side of said axle from said cylinder lever and having a piston pivotally connected to the upper end of said cylinder lever.

WALTER H. BASELT.